United States Patent
Casagrande et al.

(10) Patent No.: US 10,041,564 B2
(45) Date of Patent: Aug. 7, 2018

(54) POLY-V BELT COMPRISING A LAYER OF THERMOPLASTIC MATERIAL

(71) Applicant: DAYCO EUROPE S.R.L., Chieti (IT)

(72) Inventors: Giacomo Casagrande, Chieti (IT); Marco Di Meco, Chieti (IT); Paolo Di Marino, Chieti (IT); Fabrizio Breggia, Chieti (IT)

(73) Assignee: Dayco Europe S.R.L., Chieti (IT)

( * ) Notice: Subject to any disclaimer, the term of this patent is extended or adjusted under 35 U.S.C. 154(b) by 0 days.

(21) Appl. No.: 15/307,144

(22) PCT Filed: Apr. 30, 2015

(86) PCT No.: PCT/IB2015/053169
§ 371 (c)(1),
(2) Date: Oct. 27, 2016

(87) PCT Pub. No.: WO2015/166457
PCT Pub. Date: Nov. 5, 2015

(65) Prior Publication Data
US 2017/0045117 A1    Feb. 16, 2017

(30) Foreign Application Priority Data
Apr. 30, 2014 (IT) .............................. TO2014A0353

(51) Int. Cl.
*F16G 1/00*   (2006.01)
*F16G 5/00*   (2006.01)
(Continued)

(52) U.S. Cl.
CPC ................. *F16G 5/20* (2013.01); *F16G 5/04* (2013.01); *F16G 5/08* (2013.01)

(58) Field of Classification Search
CPC ..... F16G 5/20; F16G 1/28; F16G 5/06; Y10T 428/2918; B29D 29/08
(Continued)

(56) References Cited

U.S. PATENT DOCUMENTS 3,724,284 A     4/1973  Eng et al.
5,971,879 A *  10/1999  Westhoff .................. B32B 5/26
                                                        442/35
(Continued)

FOREIGN PATENT DOCUMENTS

CN         102190901 A      9/2011
EP           0280175 A2     8/1988
(Continued)

OTHER PUBLICATIONS

PCT, International Search Report and Written Opinion, International Application No. PCT/IB2015/053169, 13 pages, dated Aug. 27, 2015.
(Continued)

*Primary Examiner* — Henry Y Liu
(74) *Attorney, Agent, or Firm* — FisherBroyles, LLP; Susan M. Oiler

(57) ABSTRACT

Poly-V belts are disclosed that have a body in an elastomeric material, preferably EPDM, a plurality of durable filiform inserts longitudinally embedded in the body, and a coupling portion integrally connected to the body and comprising a plurality of V-shaped ribs in side by side arrangement alternating with V-shaped grooves. A layer of a thermoplastic material at least partially covers the ribs, and a knitted fabric is arranged over the thermoplastic material. Preferably, the thermoplastic material includes a polyolefin irradiated with a dose amount of radiation between 60 and 140 kGy.

14 Claims, 3 Drawing Sheets

(51) Int. Cl.
  *F16G 9/00* (2006.01)
  *F16G 1/04* (2006.01)
  *F16G 5/20* (2006.01)
  *F16G 5/04* (2006.01)
  *F16G 5/08* (2006.01)

(58) Field of Classification Search
  USPC .................................... 474/263, 266, 268
  See application file for complete search history.

(56) References Cited

U.S. PATENT DOCUMENTS

| | | | | |
|---|---|---|---|---|
| 6,558,282 | B2* | 5/2003 | Danhauer | F16G 5/20 |
| | | | | 474/266 |
| 6,685,785 | B1* | 2/2004 | Morris | F16G 1/28 |
| | | | | 156/137 |
| 6,824,485 | B2* | 11/2004 | Edwards | F16G 5/20 |
| | | | | 474/260 |
| 6,863,761 | B2* | 3/2005 | Knutson | B29D 29/08 |
| | | | | 156/137 |
| 6,918,849 | B2* | 7/2005 | Gregg | F16G 1/08 |
| | | | | 156/137 |
| 7,780,560 | B2* | 8/2010 | Lofgren | F16G 1/10 |
| | | | | 156/139 |
| 8,142,316 | B2* | 3/2012 | Goettsch | F16G 5/20 |
| | | | | 474/205 |
| 8,197,372 | B2* | 6/2012 | Wu | F16G 1/28 |
| | | | | 474/260 |
| 9,394,968 | B2* | 7/2016 | Di Carlo | F16G 5/20 |
| 9,506,527 | B2* | 11/2016 | South | F16G 5/20 |
| 2003/0078125 | A1* | 4/2003 | Knutson | B29D 29/08 |
| | | | | 474/260 |
| 2004/0009839 | A1* | 1/2004 | Edwards | F16G 5/06 |
| | | | | 474/260 |
| 2004/0214675 | A1 | 10/2004 | Beck | |
| 2005/0093205 | A1* | 5/2005 | Martin | B29D 29/08 |
| | | | | 264/326 |
| 2007/0249451 | A1* | 10/2007 | Wu | F16G 1/28 |
| | | | | 474/263 |
| 2007/0249452 | A1* | 10/2007 | South | F16G 1/28 |
| | | | | 474/263 |
| 2008/0132370 | A1* | 6/2008 | Goettsch | F16G 1/28 |
| | | | | 474/268 |
| 2010/0075793 | A1 | 3/2010 | Cretin et al. | |
| 2015/0141187 | A1* | 5/2015 | Di Carlo | F16G 5/20 |
| | | | | 474/263 |

FOREIGN PATENT DOCUMENTS

| | | |
|---|---|---|
| EP | 2166251 A1 | 3/2010 |
| FR | 2210251 A5 | 7/1974 |
| WO | 2013/168123 A1 | 11/2013 |

OTHER PUBLICATIONS

Nordian "Gamma Compatible Materials Reference Guide", 4 pages, dated Feb. 2012.
CN Applicaton No. 2010580023500 First Office Action dated Feb. 1, 2018, with English translation (11 pages).

* cited by examiner

US 10,041,564 B2

POLY-V BELT COMPRISING A LAYER OF THERMOPLASTIC MATERIAL

CROSS-REFERENCE TO RELATED APPLICATIONS

This application is a National Stage filing of International Application No. PCT/IB2015/053169, filed Apr. 30, 2015, which claims priority of Italian Application No. TO2014A000353, filed Apr. 30, 2014, which are incorporated herein by reference in their entireties.

TECHNICAL SECTOR

The present invention relates to a transmission belt, particularly for driving the ancillaries of an internal combustion engine, of the multi-groove or poly-V type.

STATE OF THE PRIOR ART

An ancillary transmission generally comprises a drive pulley connected to a crankshaft of an internal combustion engine of the motor vehicle, at least a second and a third pulley respectively connected to an alternator and an auxiliary component, for example a hydraulic pump, and a transmission belt for connecting the pulleys together.

Present-day engines require that the transmission members and in particular the transmission belt are capable of having an increasingly longer average lifespan even though they have to operate in high-temperature conditions and with much higher mechanical stress.

The transmission belts used nowadays for the ancillary transmission are also known as poly-V belts.

These belts comprise a body in an elastomeric material, preferably EPDM, a plurality of durable filiform inserts longitudinally embedded in the body, and a coupling portion integrally connected to the body and comprising a plurality of V-shaped ribs, side by side and alternating with V-shaped grooves.

In order to increase the transmission belt's average lifespan by decreasing abrasion, it is known to provide a layer of material more resistant to abrasion, such as, for example, a fabric, a non-woven fabric or a thermoplastic material that at least partially covers the ribs.

This solution, already available on the market, has not proved to be particularly effective.

In particular, whether a fabric or a continuous layer of thermoplastic material is used as a covering material, both tend to be "stretched" at the grooves and ribs during the vulcanization phase. It follows that the covering material is weakened right at the points where stress is greatest during use.

Furthermore, the above-mentioned covering materials entail greater friction between the contact surface of the belt and the pulley. In addition to further increasing the possibility of breakage, this greater friction also increases the noise of the belt during operation.

Attempts have consequently been made using alternative and different technical solutions to simultaneously achieve high wear resistance, low noise, in particular low noise also in humid conditions, and improved adhesion of the fabric to the body.

Thus, there are numerous known alternatives for attempting to avoid the above-described problems, for example U.S. Pat. No. 3,724,284A shows the use of a knitted fabric on the ribs of a poly-V belt. The drawback of this solution is that the elastomeric material penetrates the fabric during the vulcanization phase. In particular, in the case of a knitted fabric, the fabric is buried directly in the body compound and therefore does not enable much improvement in abrasion.

Patent EP280175 shows the use of a barrier layer or a shock absorbing layer between the rubber body and the fabric; in this patent said barrier layer has an elastomeric base.

Patent FR2210251 illustrates the use of layers of thermoplastic material on the surface of poly-V belt ribs.

Patent EP2166251 even proposes using a layer of thermoplastic material above the coupling portion and beneath a non-woven fabric. In particular, polyethylene and a thermoplastic elastomer are indicated among the polymeric materials, while the non-woven fabric could be replaced by a fabric.

However, this technical solution also fails to provide good adhesion between coupling portion, thermoplastic material and fabric.

For this reason, it is clearly indicated in patent EP2166251 that the solution with a non-woven fabric is preferred so as to increase compatibility between the body and the non-woven fabric, and the solution in which the interposed polymer material is a thermoplastic elastomer is likewise preferred.

In this case, the non-woven fabric thus becomes the working surface of the belt, but a non-woven fabric does not provide the optimal performance such as that required by more modern engines. Effectively, the non-woven fabric does not provide good performance at high temperatures.

It has also been found that it is very difficult to achieve good results in terms of noise when using a film of thermoplastic material not covered with a fabric or non-woven fabric.

In addition, both in the case where only one layer of thermoplastic material is used as a covering and in the case where the layer of thermoplastic material is in turn covered by a fabric or a non-woven fabric that forms the belt's working surface, it has been found that the results in terms of adhesion of the layer of thermoplastic material are particularly poor.

Thus, none of the above-described solutions truly enables simultaneously solving all of the problems and, in particular, a transmission belt is still being sought that has low friction, low noise and, at the same time, good adhesion.

Only a belt capable of achieving simultaneously good results in the friction and wear resistance tests, as well as in the adhesion tests, will be able to pass the endurance tests and therefore have a high average lifespan and be replaced less frequently.

SUMMARY OF INVENTION

The object of the present invention is to provide a transmission belt of the multi-groove or poly-V type, especially for driving the ancillaries of an internal combustion engine, which enables the above-described problems to be overcome.

The above-stated object is achieved by a poly-V belt that has a body of a first elastomeric material with a plurality of filiform inserts longitudinally embedded therein and a coupling portion integrally connected to the body. The coupling portion has a plurality of V-shaped ribs covered by an electron-irradiated, partially thermoplastic material, thereby being partially cross-linked, with a fibrous material over the partially thermoplastic material. The fibrous material is selected from the group consisting of a non-woven fabric, a woven fabric, and a knitted fabric, which can be treated with an elastomeric material.

DESCRIPTION OF INVENTION

Figure 1:
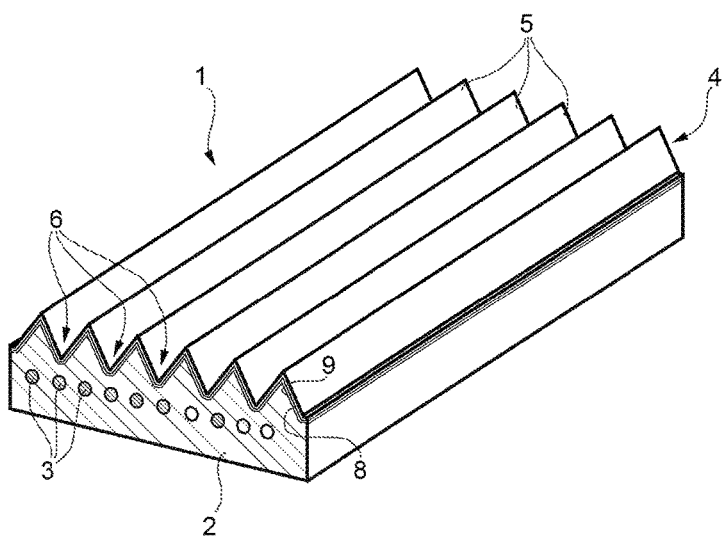
FIG. 1 is a schematic, partial view of a portion of a poly-V belt highlighting the durable inserts.

Referring to FIG. 1, reference numeral 1 indicates a poly-V belt comprising a body 2 comprising a first elastomeric material, a plurality of durable filiform inserts 3 buried longitudinally in the body, also referred to hereinafter as cords and a coupling portion 4 integrally connected to the body and comprising a plurality of V-shaped ribs 5, side by side and alternating with V-shaped grooves 6.

Figure 2:
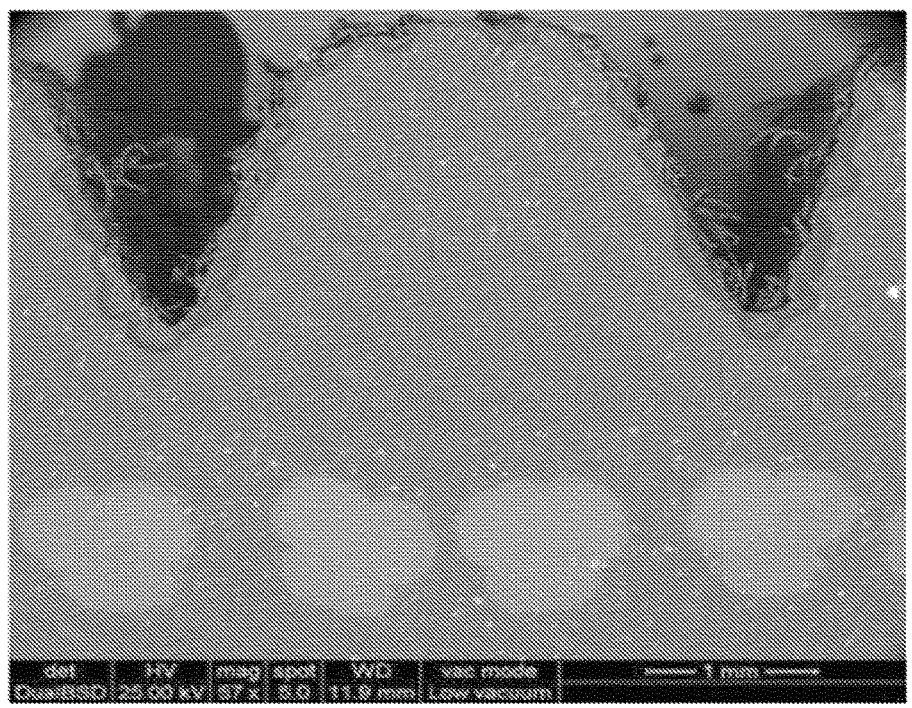
FIG. 2 is a photograph of a cross-section in the transverse direction enlarged fifty-seven times of a poly-V belt according to the invention.
Figure 3:
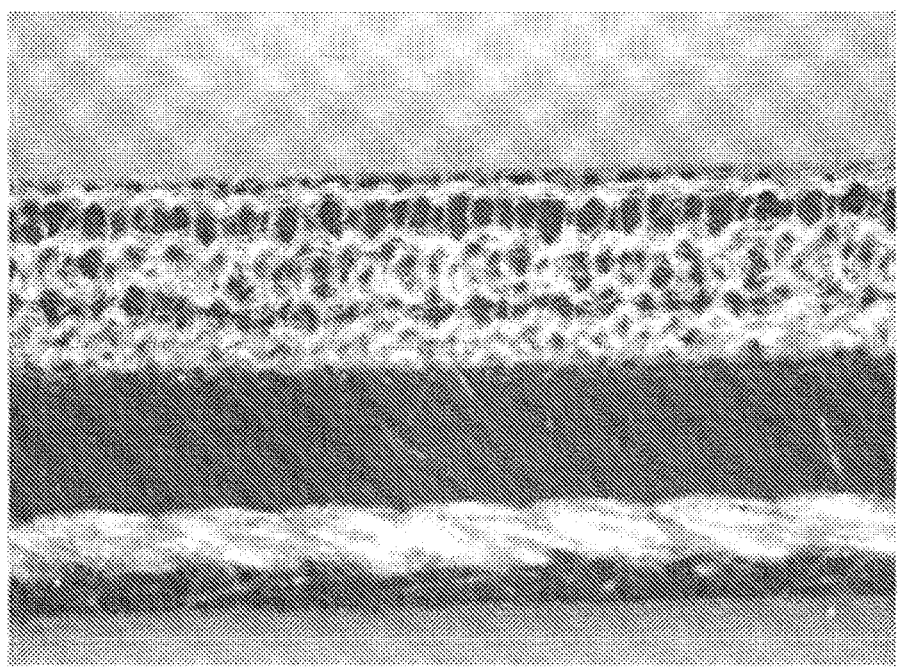
FIG. 3 is a photograph of a cross-section in the longitudinal direction of a poly-V belt according to the invention.

According to one aspect of the present invention and as shown in greater detail in FIGS. 1 to 3, the poly-V belt further comprises an at least partially thermoplastic material 8 that at least partially covers the ribs 5 and a fibrous material 9 used as a covering and made of a material chosen from the group consisting of a woven fabric, a knitted fabric or a non-woven fabric optionally buried in an elastomeric material on top of the at least partially thermoplastic material.

Preferably, the at least partially thermoplastic material forms a mostly continuous layer, but, as shown in FIGS. 2 and 3 zones of discontinuity may exist. FIGS. 2 and 3 are included specifically to show that, in reality, the at least partially thermoplastic material might not have a uniform distribution and therefore the same thickness over all the working surface or coupling portion.

The body 2 is preferably made of a compound comprising one or more elastomeric materials and numerous additives. For convenience, the elastomeric material(s) is/are hereinafter indicated altogether as the "first elastomeric material".

The body of the belt advantageously comprises an elastomer as the main elastomer in the first elastomeric material that is chosen from the group constituted by natural rubber (NR), polychloroprene (CR), acrylonitrile butadiene (NBR) and associated hydrogenated elastomers known as hydrogenated acrylonitrile butadiene (HNBR) or zinc salts of hydrogenated acrylonitrile butadiene seamed with esters of unsaturated carboxylic acid, polyisoprene, styrene-butadiene rubbers, ethylene-alpha-olefin elastomers, EPDM, polyurethane, fluoroelastomers, ethylene-acrylic elastomers (AEM), bromobutyls, chlorosulphonated polythene (CSM) or chlorosulphonated alkyl, chlorinated polythene, epoxidized natural rubber, SBR, NBR carboxylates, HNBR carboxylates, ACM and mixtures of these compounds.

The "main elastomer" is intended as being present in the compound that constitutes the body for more than 50% by weight, calculated on the total weight of all the elastomers in the compound and therefore excluding all other non-elastomeric components of the belt.

The body preferably comprises at least one polyolefin copolymer or a rubber containing acrylonitrile units as the first or a further elastomeric material.

More preferably, the first elastomeric material comprises an elastomer chosen from the group constituted by EPM (ethylene-propylene monomer), EPDM (ethylene-propylene diene monomer), NBR (acrylonitrile butadiene rubber), HNBR (hydrogenated acrylonitrile butadiene rubber), ZnHNBR (zinc salt acrylonitrile butadiene rubber), and XHNBR (peroxide-vulcanized hydrogenated acrylonitrile butadiene rubber).

In particular, among rubbers containing acrylonitrile units, those preferred are NBR, HNBR and modified HNBR, for example HNBR modified with zinc salt or ZnHBR or XHNBR. In particular, among the polyolefin copolymers, EPDM is preferred.

Even more preferably, the body comprises EPDM.

Even more preferably, it is essentially composed of EPDM.

By "first elastomeric material is essentially composed of" it is meant that in addition to all the usual additives it is possible to add small percentages of other polymers or copolymers to the compound without negatively affecting the chemical compatibility between the body compound and the other elements constituting the toothed belt and therefore without departing from the scope of the present invention.

In particular, the embodiment in which the body comprises more than 60% by weight with respect to the total weight of the elastomer, more preferably, more than 70% EPDM, is preferred.

In alternative, the embodiment in which the body is essentially composed of EPDM is also preferred.

Mixed compounds of polyolefin and rubbers containing acrylonitrile units are also preferred, more preferably, EPDM compounds with NBR or HNBR or the above-mentioned modified HNBR. For example, rubbers containing acrylonitrile units can be added to the EPDM in quantities preferably in the range between 1% and 30%.

In addition to the elastomeric materials, the body compound can comprise conventional additives such as, for example, reinforcement agents, extenders, pigments, stearic acid, accelerators, vulcanization agents, antioxidants, activators, initiators, plasticizers, waxes, prevulcanization inhibitors, antidegradants, process oils and similar.

According to one aspect of the present invention, the coupling portion 4 is covered by an at least partially thermoplastic material. In one preferred embodiment of the invention, the at least partially thermoplastic material forms a layer 8, for example as shown in the embodiment in FIGS. 1 to 3.

The at least partially thermoplastic material preferably comprises a polyolefin, more preferably a polyethylene homopolymer or copolymer.

By "at least thermoplastic" it is meant that at least one thermoplastic elastomer could be used or that the thermoplastic material could be in a compound or in any combination with a non-thermoplastic material, such as an elastomeric material for example.

In particular, it is possible to use homopolymers or copolymers based on polyethylene, ethylene-propylene, ethylene-butene, ethylene-pentene, ethylene-hexene, ethylene-heptene, ethylene-octene and copolymers or mixtures thereof.

Still more preferably, the at least partially thermoplastic material comprises a polyethylene, in particular LDPEs or LLDPEs being preferred.

LLDPEs are still further preferred.

The preferred LLDPEs have a density between 0.900 and 0.950 g/cm$^3$, more preferably between 0.915 and 0.940 g/cm$^3$.

The use of an LLDPE catalysed with metallocenes, also known as m-LLDPE, which can be used on its own or in a mixture with other homopolymers or copolymers, was found to be particularly preferred.

Preferably, the molecular weight is greater than 200,000 g/mol.

The at least partially thermoplastic material is preferably partially cross-linked.

The at least partially thermoplastic material is preferably irradiated.

In a preferred solution, the material covering the teeth is an electron-irradiated polyethylene.

The process of electron irradiation, also known as e-beam processing, is a process that involves the use of usually high-energy electrons for treating a material. Generally, the process is used to obtain at least partial cross-linking of the polymer.

The radiation energy is preferably between 1 kGy (kilogray or kGray) and 1000 kGy. The effectiveness of the irradiation and the capacity of cross-linking the polymer generally depend on the energy intensity used during irradiation.

It has been experimentally verified that to achieve the object of the present invention, radiation energy with a dose between and 200 kGy is particularly preferred, more preferably between 60 and 140 kGy.

In particular, optimal results have been obtained in terms of low noise and high adhesion with a dose between 80 and 120 kGy.

The covering material for the teeth preferably has a thickness between 10 and 500 microns, more preferably between 30 and 200 microns, even more preferably between 80 and 120 microns.

As shown in FIG. 2, the thickness of the layer can vary on the molded belt and so the thickness of the layer can be intended as the average thickness on the finished belt or, more easily, the initial thickness of the film and/or the at least partially thermoplastic material that is deposited on the material that forms the body during the production process of the belt.

A material is deposited over the at least partially thermoplastic material that is mainly constituted by fibres or filaments or yarns, preferably a material chosen from the group constituted by non-woven fabric, woven fabric or knitted fabric.

The fibrous material can be treated on one or both sides with, or even completely buried in, a second elastomeric material.

The second elastomeric material is more preferably one of the previously indicated elastomeric materials used as the first elastomeric material.

The second elastomeric material can be the same as or different from the first elastomeric material.

The elastomeric material in which the fabric is buried is preferably EPDM, but HNBR, chloroprene BR, natural rubber and SBR can be advantageously used in the alternative.

It is possible to modulate the composition of the layer of the second elastomeric material so as to adapt it to the type of application of the poly-V belt in use.

The layer of the second elastomeric material preferably has a thickness between 50 and 400 microns, more advantageously between 100 and 300 microns, for example 200 microns.

The fabric is preferably chosen from the group constituted by woven fabric, non-woven fabric and knitted fabric.

Preferably, the fabric is treated with an elastomeric material.

Preferably, the fabric is a knitted fabric.

Knitted fabric has proved to be particularly preferred when it has an "interlocked" construction.

The weight of the fabric is preferably between 25 and 200 g/m$^2$, more preferably between 50 and 100 g/m$^2$, for example 85 g/m$^2$.

The polymeric materials normally used in technical fabrics, such as aliphatic or aromatic polyamides, or polyesters for example, or even natural-based fabrics such as cotton, possibly in complex structures or mixed with a number of yarns of a chemical nature intertwined with each other, can be advantageously used as materials for the fabric.

It is particularly preferred to use a fabric comprising polyamide yarns, preferably an aliphatic polyamide such as Nylon 6/6.

Preferably, a yarn with a dtex between 25 and 100 dtex, more preferably between 30 and 50 dtex, is used both in the warp and the weft.

The transmission belt of the present invention is preferably formed according to the process that has long been known and is called "compression molding".

For example, to produce a poly-V belt 1 according to the present invention, it is possible to first form a ring blank of elastomeric material and place it around a cylinder capable of increasing its diameter until the blank completely adheres to the cylinder, then apply a cord while making the cylinder rotate to form the durable inserts. If necessary, a new layer of elastomeric material is subsequently applied and the blank then extracted from the cylinder after having reduced the latter's diameter and, finally, the semi-finished part is vulcanized in a vulcanization cylinder to form the ribs.

To produce the belt 1 of the present invention it is also necessary to perform the step of applying an at least partially thermoplastic material over the layer of the first elastomeric material that forms the coupling portion of the body 2. Then a layer of fibrous material, in particular a preferably non-woven fabric, is applied. It is then necessary to carry out the step of vulcanization under pressure to mold the belt and form the ribs.

From examination of the characteristics of the belt 1 produced according to the present invention, the advantages obtainable are evident.

Significant improvements have been obtained using a poly-V belt according to the present invention and, in particular, it has been possible to overcome the above-described problems.

In particular, the at least partially thermoplastic layer 8, and in particular with optimal results when irradiated with a dose between 80 and 120 kGy, enables preventing the body compound penetrating the fabric 10 and, in particular, in penetrating the knitted fabric during the step of vulcanization and formation of the ribs 5, rendering pointless the use of the fabric 10 that would end up being buried in the body 2.

Furthermore, due to the irradiation of the at least partially thermoplastic material, the adhesion between coupling portion of the body and the fibrous covering material is improved.

In addition, due to the use in particular of a knitted fabric 10 as the fibrous covering material, it is possible to have a low-cost elastic fabric that optimally adapts to the profile of the ribs 5.

The belt 1 will hereinafter be described with reference to examples, although it is not limited to these.

Examples 1-3

Three poly-V belts, called A, B and C, were molded with all of them having a body in EPDM.

Molded belts including a knitted fabric on the surface of the ribs or a layer of thermoplastic material or a layer of thermoplastic covered by a knitted fabric buried in an elastomeric material were used and experimented in the past.

However, these belts exhibited problems of adhesion.

All three if the belts have a knitted fabric on the surface of the ribs made of a polyamide 6/6 yarn with an interlock construction. The yarn has one ply and 13 filaments, 44 dtex, s twist and z twist and a tenacity of 47 cN/tex.

In the case of belt A, the layer of thermoplastic material is a polyethylene, in particular an m-LLDPE, electron irradiated with a dose of 50 kGy.

In the case of belt B, the layer of thermoplastic material is a polyethylene, in particular an m-LLDPE, electron irradiated with a dose of 100 kGy.

In the case of belt C, the layer of thermoplastic material is a polyethylene, in particular an m-LLDPE, electron irradiated with a dose of 150 kGy.

The following tests were carried out:
1. Coefficient of friction measurement test
2. Pulley misalignment noise test
3. Fabric adhesion test
1. Coefficient of Friction Measurement Test The belts tested are poly-V belts having the profile commercially known as poly-V K, i.e. suitable for use in vehicles, with 6 ribs and a belt portion with length of the of 400 mm for the measurement.

Figure 4:
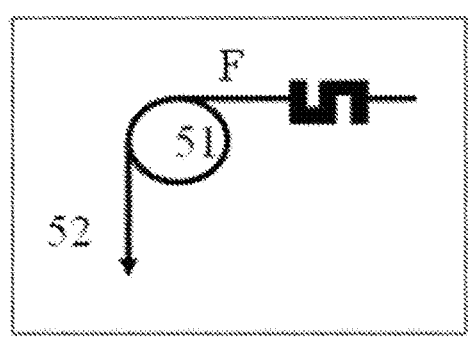
FIG. 4 is the diagram of the transmission system for measuring the coefficient of friction.

The transmission diagram for the test is shown in FIG. 4, where reference numeral 51 indicates the drive pulley, 52 indicates the dead weight and F indicates the force measured with a load cell.

The drive pulley, provided with grooves or ribs, is in stainless steel and has a diameter of 61 mm measured as DOB (Diameter Over Ball). The maximum roughness of the pulley is 3.2 microns.

The tests were performed under the following conditions:
Chamber temperature=27° C.
Drive pulley speedy=100 RPM
Dead weight=90N (6 ribs) 70N (belts with 5 ribs)

The procedure for performing the test is the following:
Mount the belt in the clamp
Then load the dead weight
Subsequently start the equipment or rig at 100 rpm for 20 min.
Then check the temperature of the belt back (>35° C.)
Finally start to record F, the force on the belt.
The results of test on the coefficient of friction COF are calculated with the following formulas:

$$COF = (Ln(F/Deadweight) \times sine\, b/2)/\theta$$

where:
COF=coefficient of friction
CoF*=overall coefficient of friction
= COF/(sine b/2)=Ln (F/Deadweight)/θ
b=rib angle=40°
θ=turning angle=90°.
2. Pulley Misalignment Noise Test Belts with a 6-rib PVK profile and an effective length of 1200 mm were used for this test.

Figure 5:
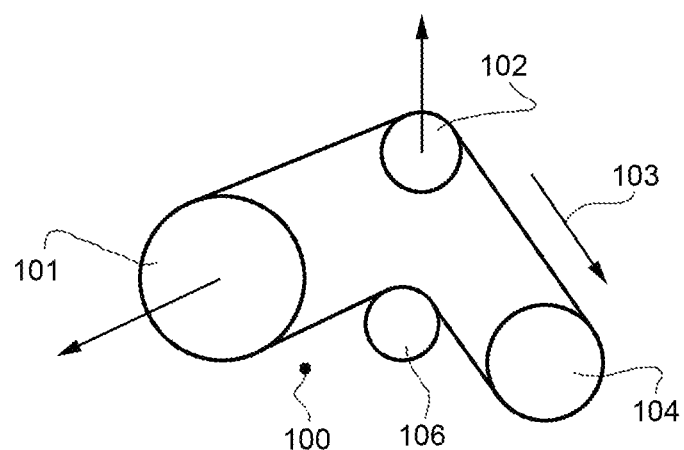
FIG. 5 is the diagram of the transmission system for the pulley misalignment noise test measurement.

FIG. 5 shows the transmission system for the measurement of pulley misalignment noise.

In the figure, the various items are shown with the following reference numerals:
100 microphone
101 driven pulley
102 dead weight tensioner
103 working direction of belt
104 drive pulley
106 idler The characteristics of the various pulleys and the transmission system are indicated below:

The drive pulley 104, equipped with grooves or ribs, has a diameter of 71.0 mm DOB and is in stainless steel.

The tensioner 102, equipped with grooves or ribs, has a diameter of 61.0 mm DOB and is in stainless steel.

The driven pulley 101, equipped with grooves or ribs, has a diameter of 156.0 mm DOB and is in stainless steel.

The (flat) idler has a diameter of 65.0 mm and is in stainless steel.

The specifications for the test are the following:
Chamber temperature=27° C.
Relative humidity=60%
Misalignment: 0÷5.0 degrees with 0.25° variations, degree increments on driven pulley
The speed of the drive pulley is 3000 RPM
Torque resistance of driven pulley: none
Belt tension=300 N (50 N/rib).
Test procedure:
Set pulley misalignment to 0°
Start the equipment at 3000 rpm for 30 secondi
Check temperature of the belt back (<=35° C.)
Run test for all misalignments and speed combinations (10 sec each variation)
Test failure criterion is noise exceeding 86 db.
3. Fabric Adhesion Test The test is used to determine the value of adhesion between the fabric and the body compound of the belt on the tooth and on the base surface.

The procedure consists in taking a piece of belt from 200 to 300 mm in length. The piece can also be obtained from a tensioned belt.

It is necessary to separate the fabric on the rib from the compound until a sufficient length is obtained for anchoring it in the jaws of the clamp.

Start to apply tension at the speed of 50 mm/min.

The test is terminated after having tensioned a length of fabric sufficient to determine the adhesion value.

The final result is given by the average of the values taken on the tensioned test piece, excluding the initial part of the test if the segment is not uniform.
Test results:

The three tests described above were performed on the three previously described belts A, B and C and the results are listed in Table 1.

TABLE 1

| Test | Units | A (50 kGy) | B (100 kGy) | C (150 kGy) |
|---|---|---|---|---|
| 1 Friction | | 1.4 | 0.9-1.4 | <0.9 |
| 2. Noise | ° misalignment | <3 | 3-4.5 | 4-5 |
| 3. Adhesion | | >7 | 2.5-7 | 0.5-2.5 |

It is evident from an analysis of the table that all three belts according to the present invention enable achieving optimal results.

In particular, as the irradiation increases, a decreasing and therefore always better coefficient of friction is recorded, an increasing misalignment at which noise occurs and therefore always better, and adhesion that instead decreases and therefore worsens.

Nevertheless, all of the values are good, unlike what happens in the case where only one layer of thermoplastic material, only one layer of a textile material or one layer of thermoplastic material covered by a layer of textile material buried in an elastomeric material, is used.

However, belt A has very low misalignment and is therefore noisy, while belt C has non-optimal results in terms of adhesion.

Vice versa, in the case of belt B where the radiation dose is between 60 and 140 and in particular between 80 and 120, for example 100, an optimal balance is possible between the values obtained in the coefficient of friction test, the noise test and the adhesion test, and so it has been found that the radiation doses strongly affect the performance of the final belt which remains particularly good only within a narrow range of radiation doses.

The invention claimed is:

1. A poly-V belt comprising:
    a body comprising a first elastomeric material,
    a plurality of filiform inserts longitudinally embedded in the body, and
    a coupling portion integrally connected to the body and comprising:
        a plurality of V-shaped ribs, side by side and alternating with V-shaped grooves,
    an at least partially thermoplastic material arranged over said coupling portion and at least partially covering said ribs, and
    a fibrous material chosen from the group consisting of a non-woven fabric, a woven fabric and a knitted fabric arranged over said at least partially thermoplastic material,
    wherein said at least partially thermoplastic material is an electron-irradiated, partially thermoplastic material, thereby being partially cross-linked.

2. A belt according to claim 1, wherein said at least partially thermoplastic material is irradiated with radiation energy comprised between 10 and 200 kGy.

3. A belt according to claim 2, wherein said radiation energy is comprised between 60 and 140 kGy.

4. A belt according to claim 2, wherein said radiation energy is comprised between 80 and 120 kGy.

5. A belt according to claim 1, wherein said first elastomeric material is an ethylene-alpha-olefin elastomer.

6. A belt according to claim 1, wherein said ethylene-alpha-olefin elastomer is EPDM.

7. A belt according to claim 1, wherein said at least partially thermoplastic material comprises a polyolefin.

8. A belt according to claim 1, wherein said thermoplastic material comprises a polyethylene homopolymer or copolymer.

9. A belt according to claim 8, wherein said polyethylene is chosen from the group constituted by LDPE, LLDPE, UHMWDPE or mixtures thereof.

10. A belt according to claim 1, wherein said thermoplastic material has a thickness comprised between 30 μm and 200 μm.

11. A belt according to claim 1, wherein said fibrous material is a knitted fabric.

12. A belt according to claim 11, wherein said knitted fabric has an interlock configuration.

13. A belt according to claim 11, wherein the basis weight of said knitted fabric is comprised between 50 and 100 g/m2.

14. A belt according to claim 1, wherein the fabric is treated with an elastomeric material.

* * * * *